(12) United States Patent
Nanaji (10) Patent No.: US 6,830,080 B2
(45) Date of Patent: Dec. 14, 2004

(54) OUTPUT CONTROL FOR TURBINE VAPOR FLOW METER

(75) Inventor: Seifollah S. Nanaji, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 131 days.

(21) Appl. No.: 10/387,713

(22) Filed: Mar. 13, 2003

(65) Prior Publication Data

US 2004/0177894 A1 Sep. 16, 2004

(51) Int. Cl.[7] .............................................. B65B 31/00
(52) U.S. Cl. ............................ 141/59; 141/4; 141/94; 141/95; 141/192; 73/861.79
(58) Field of Search ................... 141/2, 4, 5, 9, 141/59, 67, 83, 94, 95, 192, 285, 39, 44, 47, 50; 73/861, 861.79

(56) References Cited

U.S. PATENT DOCUMENTS

| | | | |
|---|---|---|---|
| 3,711,689 A | 1/1973 | Park ........................ 235/151.34 |
| 3,998,089 A | 12/1976 | Grove et al. ...................... 73/3 |
| 4,120,032 A | 10/1978 | Mirdadian ................... 364/510 |
| 4,885,943 A | 12/1989 | Tootell et al. ............ 73/861.77 |
| 4,887,469 A | 12/1989 | Shoptaw ................... 73/861.77 |
| 4,977,528 A | 12/1990 | Norris ...................... 364/571.04 |
| 5,038,838 A | 8/1991 | Bergamini et al. ............. 141/59 |
| 5,040,577 A | 8/1991 | Pope ............................ 141/59 |
| 5,184,309 A * | 2/1993 | Simpson et al. ............. 700/283 |
| 5,195,564 A | 3/1993 | Spalding ......................... 141/1 |
| 5,319,545 A | 6/1994 | McGarvey et al. .......... 364/403 |
| 5,400,253 A | 3/1995 | OConnor ..................... 364/442 |
| 5,423,457 A | 6/1995 | Nicholas et al. ............... 222/62 |
| 5,464,466 A | 11/1995 | Nanaji et al. ................... 95/45 |
| RE35,238 E | 5/1996 | Pope ............................ 141/59 |
| 5,549,142 A * | 8/1996 | Beale ........................... 141/49 |
| 5,636,667 A | 6/1997 | Young et al. .................. 141/59 |
| 5,689,071 A | 11/1997 | Ruffner et al. ............ 73/861.84 |
| 5,734,851 A | 3/1998 | Leatherman et al. ......... 395/329 |
| 5,768,883 A | 6/1998 | Mayer ........................ 60/39.03 |
| 5,831,176 A | 11/1998 | Morgenthale et al. ... 73/861.77 |
| 5,956,259 A | 9/1999 | Hartsell, Jr. et al. .... 364/528.37 |
| 6,019,146 A * | 2/2000 | Taylor .......................... 141/59 |
| 6,052,629 A | 4/2000 | Leatherman et al. ......... 700/241 |
| 6,158,288 A | 12/2000 | Smith ....................... 73/861.25 |
| 6,170,539 B1 | 1/2001 | Pope et al. .................... 141/59 |
| 6,381,549 B1 | 4/2002 | Smith ........................... 702/54 |
| 6,386,246 B2 | 5/2002 | Pope et al. .................... 141/59 |

\* cited by examiner

Primary Examiner—Timothy L. Maust
(74) Attorney, Agent, or Firm—Withrow & Terranova PLLC (57) ABSTRACT

A turbine flow meter used as a vapor flow meter in a vapor recovery-equipped fuel dispenser. The turbine flow meter measures the vapor recovered by the fuel dispenser during a fueling operation that is returned back to the underground storage tank. The turbine flow meter measurements may be ignored when fuel is no longer flowing through the fuel dispenser since the turbine rotors in the turbine flow meter may continue to rotate even after vapor is no longer being recovered.

26 Claims, 5 Drawing Sheets

OUTPUT CONTROL FOR TURBINE VAPOR FLOW METER

FIELD OF THE INVENTION

The present invention relates to a device, system, and method of using a turbine flow meter to measure recovered vapor in a vapor recovery-equipped fuel dispenser.

BACKGROUND OF THE INVENTION

Many fuel dispensers in a service station environment are now equipped with vapor recovery in order to meet governmental regulations. As fuel is being dispensed into a vehicle fuel tank, vapors that are present in the vehicle fuel tank exit out of the vehicle's fuel tank fill neck. Vapor recovery-equipped fuel dispensers are designed to recover all or substantially all of the vapor that would otherwise escape into the atmosphere at the fuel tank fill neck. The nozzle and hose on the fuel dispenser are specially equipped with a vapor return path wherein vapors that exit the fuel tank fill neck during refueling enter into the nozzle and hose and are returned back to the underground storage tank. If the nozzle is not sealed with the vehicle fuel tank fill neck during refueling, an assisted system may be used wherein a vacuum is created in the vapor return line to draw vapors into the vapor return line. An example of such an assist vapor recovery system is described in U.S. Pat. No. 5,040,577, entitled "Vapor recovery system for fuel dispenser," now Reissue Pat. No. RE35,238. An example of a non-assisted vapor recovery system wherein a seal is created between the vapor return path in the nozzle and the vehicle fuel tank filler neck is illustrated in U.S. Pat. No. 5,636,667 entitled "Conversion of fuel dispensers to provide for vacuum assisted vapor recovery." This system is commonly referred to as a "balance system."

There are several reasons why a vapor flow meter may be desired in a vapor recovery-equipped fuel dispenser. When vapor recovery-equipped fuel dispensers were first introduced into the marketplace, there was no method of determining whether vapor was actually being recovered. For example, in an assisted system, the vapor pump that creates a vacuum in the vapor return line may be inoperable or not operating properly. In an unassisted system, such as the balance system, the vapor return line may contain a leak such that recovered vapors escape through the leak before reaching the underground storage tank. Fuel dispenser manufacturers have contemplated placing a vapor flow meter in the vapor return line of fuel dispensers in order to measure recovered vapor as one method of verifying that vapors are actually being recovered and returned to the underground storage tank. If the vapor flow meter registers a vapor flow, then vapors are being recovered. The fuel dispenser can analyze the amount of vapor recovered, as measured by the vapor flow meter, to determine if the anticipated amount of vapor is being recovered in relation to the flow rate of fuel being dispensed since vapors are pushed out of the vehicle fuel tank filler neck at a rate proportional to the fuel flow rate being placed inside the vehicle fuel tank.

One example of a vapor flow meter incorporated into an assisted vapor recovery-equipped fuel dispenser is described in U.S. Pat. No. 6,347,649, entitled "Pressure sensor for a vapor recovery system." In this system, the recovered vapor enters into the vapor return line and enters into a vapor flow meter inline to the vapor return line. The vapor measurements measured by the vapor flow meter are communicated to a control system. The control system verifies that vapors are being recovered when expected using the measurements received from the vapor flow meter. Also, if it is desired to calculate the vapor-to-liquid (V/L) ratio of the fuel dispenser, which is used to determine the fuel dispenser's vapor recovery efficiency, a vapor flow meter is needed to measure the amount of vapor being recovered for the "V" value in the "V/L" ratio calculation.

Any number of different types of meters may be used to provide the vapor flow meter. Some meters are inferential meters, meaning that the actual displacement of the liquid or gaseous material is not measured. An inferential meter uses some other characteristic other than actual displacement to measure flow rate or volume of recovered vapor. Inferential meters sometimes have advantages over positive displacement meters, including smaller size. One example of an inferential meter that may be used as a vapor flow meter is known as a turbine flow meter, like that described in U.S. Pat. No. 5,689,071, entitled "Wide range, high accuracy flow meter." The turbine flow meter described in this patent measures the flow rate of a fluid or gaseous material by determining the number of rotations of a turbine rotor located inside the flow path of the meter.

As vapor enters the inlet port of the turbine flow meter in the aforementioned '071 patent, the vapor passes across two turbine rotors inside the meter's housing. The vapor causes the turbine rotors to rotate. The rotational velocity of the turbine rotors is sensed by pick-off coils. The pick-off coils are excited by an a-c signal that produces a magnetic field. As the turbine rotor rotates, the vanes on the turbine rotors pass through the magnetic field generated by the pick-off coils thereby superimposing a pulse on the carrier waveform of the pick-off coils. The superimposed pulses occur at a repetition rate (pulses per second) proportional to the rotors velocity and hence proportional to the measured rate of vapor flow.

However, a problem occurs when using a turbine vapor flow meter such as the one described in the aforementioned '071 patent. When the fuel dispenser nozzle is disengaged and fuel is no longer flowing into the vehicle fuel tank, vapor is no longer being pushed out of the vehicle fuel tank and into the vapor return line. However, the previous rotational momentum of the turbine rotors inside the turbine flow meter causes the turbine rotors to continue to rotate even after vapor is no longer flowing into the vapor return line. This causes the turbine vapor flow meter to continue generating measurement signals as if vapor was still flowing since the turbine rotors continue to rotate for a certain amount of time after vapor flow stops. The control system that receives the measurement signals from the pick-off coils of the turbine flow meter continues to register vapor flow falsely.

A solution to the aforementioned problem must be found in order to use a turbine flow meter as an accurate vapor flow meter in a vapor recovery-equipped fuel dispenser. The present invention provides a solution to this problem.

SUMMARY OF THE INVENTION

The present invention relates to a turbine flow meter used as a vapor flow meter in a vapor recovery-equipped fuel dispenser. The vapor flow meter measures that amount of vapor recovered by the fuel dispenser and thereafter returned to the underground storage tank during a fueling operation. It may be desireable to measure the amount of vapor returned to the underground storage tank as an indication that the vapor recovery system in the fuel dispenser is properly operating, a leak is not present in the vapor return path, and/or calculation of the vapor-to-liquid (V/L) ratio of the fuel dispenser for performance monitoring and/or measurement.

The turbine flow meter is used as the vapor flow meter. The turbine flow meter is an inferential meter that is small in size and highly accurate. The turbine flow meter contains one or more turbine rotors on a shaft inside the turbine flow meter. As vapor passes through the turbine flow meter, the vapor causes the turbine rotor(s) to rotate. The turbine rotor(s) contains a plurality of vanes made out of a magnetic material. A pick-off coil is placed on the meter in close proximity to the turbine rotor(s). The pick-off coil generates an a-c carrier signal that generates a magnetic field around the vanes of the turbine rotor(s). As the turbine rotor(s) rotates, the vanes superimpose a pulse signal on the pick-off coil carrier signal that is detected by the pick-off coil. The pick-off coil communicates the carrier signal with pulses superimposed to a control system inside the fuel dispenser. The pulses are counted to determine the rotational speed of the turbine rotor(s) and thereby to determine the vapor flow rate.

Because the turbine rotor(s) may continue to rotate due to their rotational momentum for some period of time after vapor discontinues flowing through the turbine flow meter, the pulse-encoded carrier signal from the pick-off coil continues to indicate pulses even after vapor recovery has stopped thereby yielding an inaccurate measurement. The present invention involves determining when fuel flow is inactive and has stopped as an indication of when to ignore the pulses on the carrier signal from the pick-off coil. When fuel is no longer flowing, vapor is not being recovered and returned through the vapor flow meter since vapor is only pushed out of the vehicle fuel tank when fuel is being delivered to the vehicle fuel tank.

There are several different techniques to determine when fuel is no longer flowing in a fuel dispenser. In one embodiment, the control system that determines when to ignore the pulses on the vapor flow meter carrier signal uses the pulse stream from the fuel flow meter as an indication that fuel is either flowing or is not flowing.

In another embodiment, the control system that determines when to ignore the pulses on the vapor flow meter carrier signal uses a signal from a flow switch located on the outlet side of the fuel flow meter as an indication that fuel is either flowing or is not flowing. The flow switch generates a signal that indicates whether fuel is flowing or not flowing.

In another embodiment, the control system that determines when to ignore the pulses on the vapor flow meter carrier signal uses a signal that controls the fuel flow control valve located in the fuel flow path. The fuel flow control valve is opened when fuel is allowed to flow, and is closed when fuel is not allowed to flow. The fuel flow control valve signal status indicates whether fuel is flowing or not flowing.

In another embodiment, the control system that determines when to ignore the pulses on the vapor flow meter carrier signal uses a signal that controls the vapor pump for vapor recovery. The vapor pump is activated when vapor is to be recovered, and is deactivated when vapor recovery is no longer required. The vapor pump is activated when fuel flow is allowed and/or begins. Therefore, the vapor pump signal status indicates whether fuel is flowing or not flowing.

In another embodiment, the control system that determines when to ignore the pulses on the vapor flow meter carrier signal uses a signal that controls the vapor valve inline to the vapor return line. The vapor valve is open when vapor is to be recovered, and is closed when vapor recovery is not required. The vapor valve is opened when fuel flow is allowed and/or begins. Therefore, the vapor valve signal status indicates whether fuel is flowing or not flowing.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
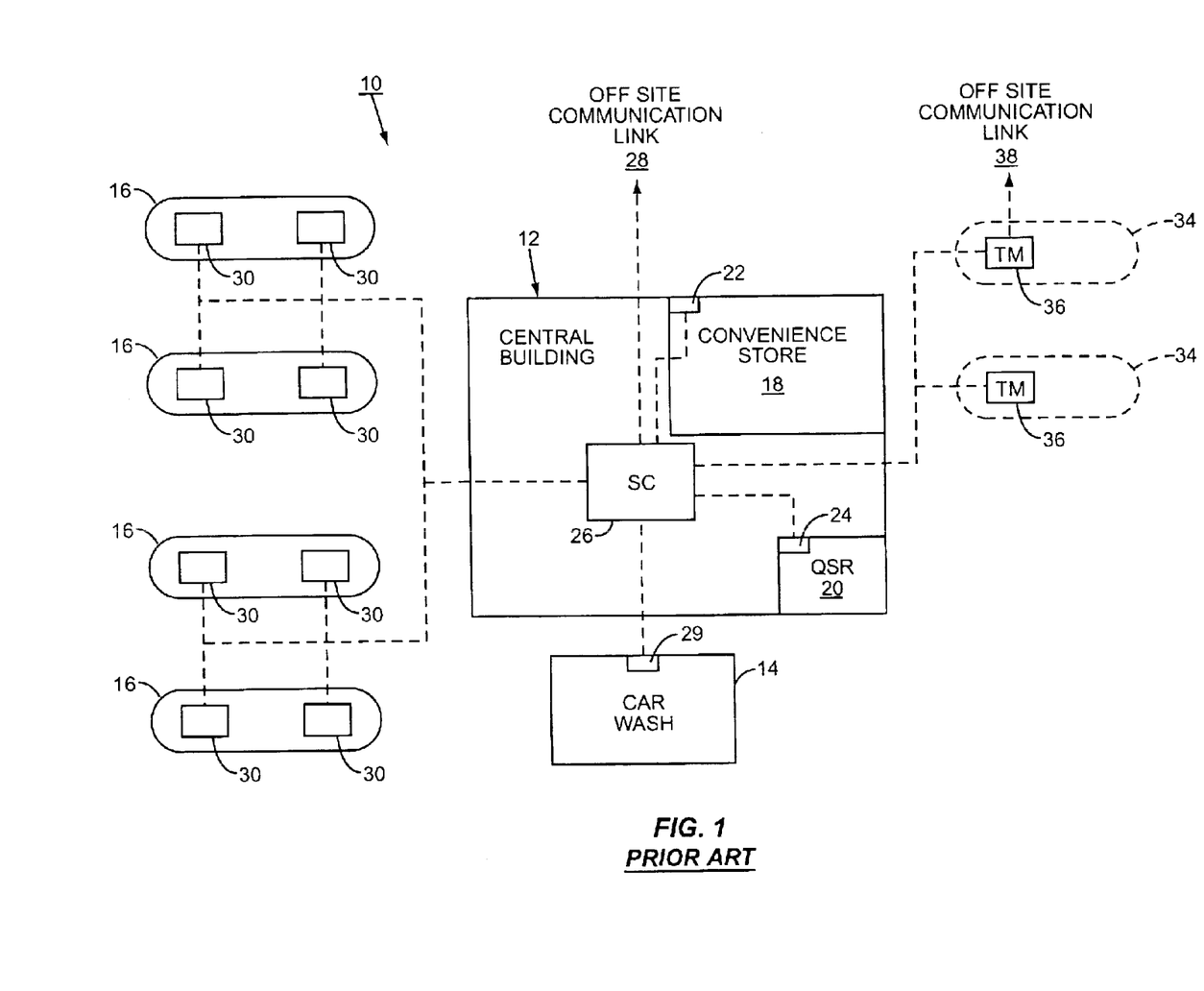
FIG. 1 illustrates a typical service station environment in the prior art.

Fueling environments come in many different designs. Before describing the particular aspects of the present invention (which begins at the description of FIG. 2), a brief description of a fueling environment follows. A conventional exemplary fueling environment 10 is illustrated in FIG. 1. Such a fueling environment 10 may comprise a central building 12, a car wash 14, and a plurality of fueling islands 16.

The central building 12 need not be centrally located within the fueling environment 10, but rather is the focus of the fueling environment 10, and may house a convenience store 18 and/or a quick serve restaurant 20 therein. Both the convenience store 18 and the quick serve restaurant 20 may include a point-of-sale (POS) 22, 24, respectively. The central building 12 may further house a site controller (SC) 26, which in an exemplary embodiment may be the G-SITE® sold by Gilbarco Inc. of Greensboro, N.C. The site controller 26 may control the authorization of fueling transactions and other conventional activities as is well understood. The site controller 26 may be incorporated into a POS, such as POS 22, if needed or desired. Further, the site controller 26 may have an off-site communication link 28 allowing communication with a remote location for credit/debit card authorization, content provision, reporting purposes or the like, as needed or desired. The off-site communication link 28 may be routed through the Public Switched Telephone Network (PSTN), the Internet, both, or the like, as needed or desired.

The car wash 14 may have a POS 29 associated therewith that communicates with the site controller 26 for inventory and/or sales purposes. The car wash 14 alternatively may be a standalone unit. Note that the car wash 14, the convenience store 18, and the quick serve restaurant 20 are all optional and need not be present in a given fueling environment.

The fueling islands 16 may have one or more fuel dispensers 30 positioned thereon. The fuel dispensers 30 may be, for example, the ECLIPSE® or ENCORE® sold by Gilbarco Inc. of Greensboro, N.C. The fuel dispensers 30 are in electronic communication with the site controller 26 through a LAN or the like.

The fueling environment 10 also has one or more underground storage tanks 34 adapted to hold fuel therein. As such, the underground storage tank 34 may be a double-walled tank. Further, each underground storage tank 34 may include a tank monitor (TM) 36 associated therewith. The tank monitors 36 may communicate with the fuel dispensers 30 (either through the site controller 26 or directly, as needed or desired) to determine amounts of fuel dispensed and compare fuel dispensed to current levels of fuel within the underground storage tanks 34 to determine if the underground storage tanks 34 are leaking.

The tank monitor 36 may communicate with the site controller 26 and further may have an off-site communication link 38 for leak detection reporting, inventory reporting, or the like. Much like the off-site communication link 28, off-site communication link 38 may be through the PSTN, the Internet, both, or the like. If the off-site communication link 28 is present, the off-site communication link 38 need not be present and vice versa, although both links may be present if needed or desired. As used herein, the tank monitor 36 and the site controller 26 are site communicators to the extent that they allow off site communication and report site data to a remote location.

Figure 2:
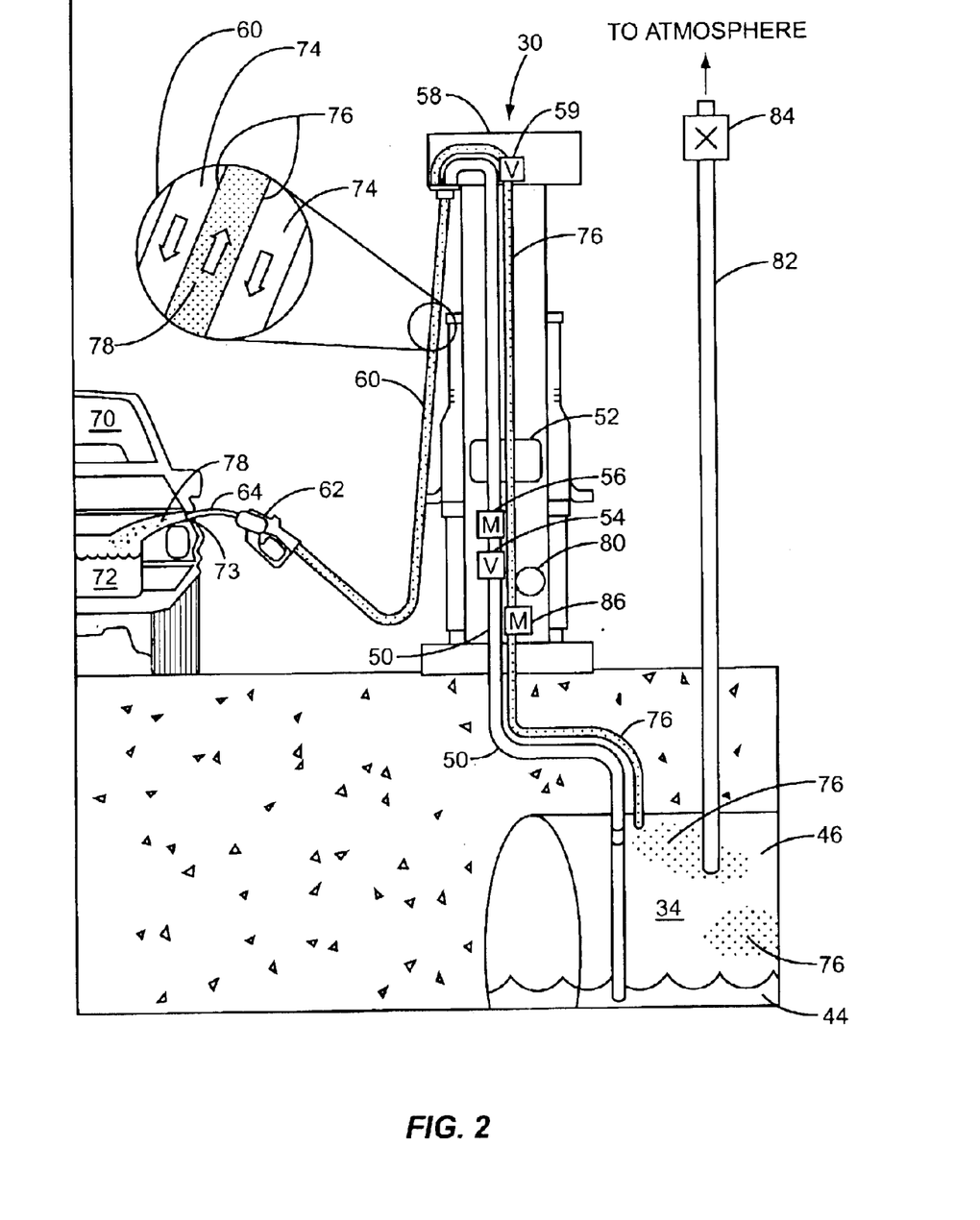
FIG. 2 illustrates a fuel dispenser according to an embodiment the present invention.

Now turning to the aspects of the present invention in providing an accurate turbine flow meter as a vapor flow meter, a typical fuel dispenser 30 in a service station environment according to one embodiment of the present invention is illustrated in FIG. 2. Fuel 44 from the underground storage tank 34 is fluidly coupled to a fuel dispenser 30 via a fuel supply conduit 50. A submersible turbine pump (not shown) creates a negative pressure inside the fuel supply conduit 50 to draw the fuel 44 up into the body of the fuel dispenser 30. Whenever fuel 44 is to be dispensed, a control system 52 in the fuel dispenser 30 causes a flow control valve 54 inline to the fuel supply conduit 50 to open to allow fuel 44 to flow past the flow control valve 54 upward and through a fuel meter 56. The control system 52 may be any type of electronics, micro-controller, or microprocessor.

The fuel meter 56 measures the amount of fuel 44 flowing through the fuel supply conduit 50. The fuel 44 goes up to the top of the fuel dispenser 30 in a canopy area 58. Thereafter, the fuel 44 enters into a hose 60 and onward to a nozzle 62 and out of the spout 64 of the nozzle 62 until the fuel 44 reaches a vehicle fuel tank 72 inside a vehicle 70 being refueled.

For further information on how elements of a fueling environment 10 may interact, reference is made to U.S. Pat. No. 5,956,259, which is hereby incorporated by reference in its entirety. Information about fuel dispensers may be found in commonly owned U.S. Pat. Nos. 5,734,851 and 6,052,629, which are hereby incorporated by reference in their entireties. An exemplary tank monitor 36 is the TLS-350R manufactured and sold by Veeder-Root. For more information about tank monitors 36 and their operation, reference is made to U.S. Pat. Nos. 5,423,457; 5,400,253; 5,319,545; and 4,977,528, which are hereby incorporated by reference in their entireties.

Before describing the particular aspects of the vapor flow meter of the present invention, a general description of a vapor recovery-equipped fuel dispenser follows.

A typical vapor recovery-equipped fuel dispenser 30 is illustrated in FIG. 2. As fuel 44 is delivered into the vehicle fuel tank 72, vapor 78 present in the fuel tank 72 is pushed outward through a vehicle fuel tank filler neck 73 in an equal volume exchange since the only escape path for the vapor 78 is the vehicle fuel tank filler neck 73. The fuel dispenser 30 is vapor equipped such that the spout 64, nozzle 62 and hose 60 contain a vapor return line 76 for vapor 78 to be recovered. If the fuel dispenser 30 contains an assisted vapor recovery system, a vapor pump 80 is usually placed inline and fluidly coupled to the vapor return line 76 to create suction in the vapor return line 76. The control system 52 activates the vapor pump 80 and opens an optional vapor valve 59 inline in the vapor return line 76 when fuel 44 begins flowing, and vapor 78 is being pushed out of the vehicle fuel tank 72. The suction in the vapor return line 76 substantially captures the vapor 78 at the spout 64 of the nozzle 62.

The vapor 78 returns through the vapor return line 78 inside the nozzle 62 and hose 60 and up to the canopy 58 of the fuel dispenser 30. As the hose 60 enters the canopy 58, the vapor return line 76 and fuel supply conduit 50 are separated into two separate conduits. The vapor 78 is returned through the vapor return line 76 back to the ullage area 46 of the underground storage tank 34. In this manner, vapors 78 are recovered and returned back to the underground storage tank 34 instead of being released to atmosphere at the filler fuel neck 73. Even if the fuel recovery-equipped fuel dispenser 30 is equipped with some other type of vapor recovery system, the principle of returning recovered vapors to the underground storage tank 34 remains the same. For more information on vapor recovery systems, see aforementioned U.S. Pat. Nos. 5,040,577 and RE35,238, in addition to U.S. Pat. Nos. 6,170,539; 6,386,246; 5,038,838; and 5,195,564, all of which are hereby incorporated by reference in their entireties.

According to the present invention, a vapor flow meter 86 is placed inline to the vapor return line 76 so that the amount of vapor 78 being returned is measured and confirmed by the control system 52 to detect leaks and/or measure the V/L ratio of the fuel dispenser 30. If too much pressure builds up inside the underground storage tank 34, the vapor 78 in the ullage area 46 can be released through a vent pipe 82, coupled to the ullage area 46, to atmosphere. A pressure relief valve 84 is placed on the vent pipe 82, and the pressure relief valve 84 opens when a threshold pressure in the vent pipe 82 and ullage area 46 is exceed a threshold pressure like described in U.S. Pat. No. 5,464,466, entitled "Fuel storage tank vent filter system," which is hereby incorporated by reference in its entirety.

Figure 3:
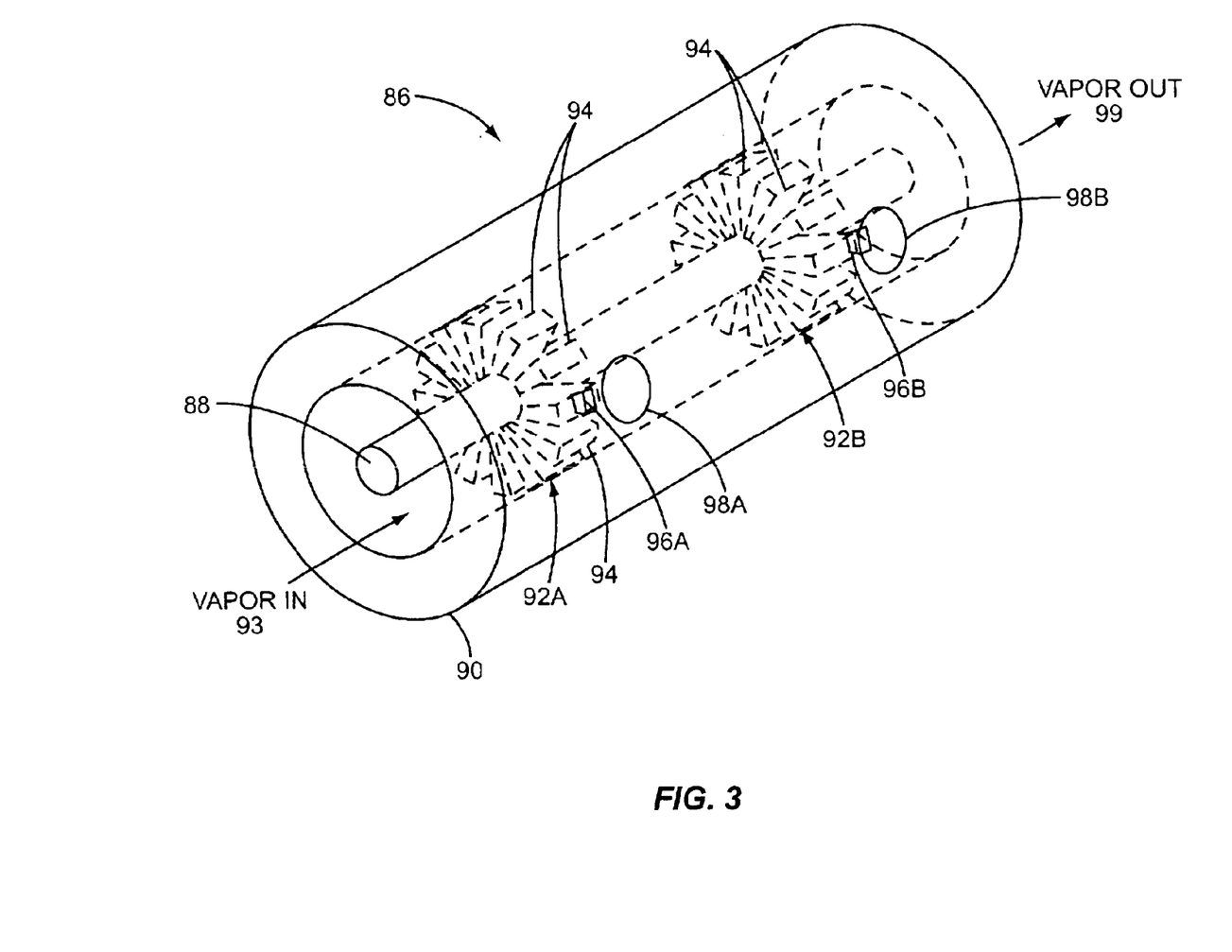
FIG. 3 is a schematic diagram of a turbine vapor flow meter that may be used as the vapor flow meter according to the present invention.

In the present invention, the vapor flow meter 86 is a turbine flow meter. An example of a turbine flow meter is illustrated in FIG. 3 and is like that described in U.S. Pat. No. 5,689,071 entitled "Wide range, high accuracy flow meter," which is hereby incorporated by reference in its entirety. The turbine vapor flow meter 86 is an inferential meter, and therefore can be small in size and conveniently located in any desired location in the vapor return line 76.

As illustrated in FIG. 3, a turbine vapor flow meter 86 is comprised of a shaft 88 surrounded by a cylindrical, hollow housing 90. One or more turbine rotors 92A, 92B are mounted on the shaft 88. Each of the turbine rotors 92A, 92B contains vanes 94 that are made out of a magnetic material. As the vapor 78 enters into the inlet 93 of the turbine vapor flow meter 86, the vapor 78 flows into the vanes 94, causing the turbine rotors 92A, 92B to rotate. As the turbine rotors 92A, 92B rotate, pick-off coils 96A, 96B detect each of the vanes 94 as they rotate. Shaft 98A, 98B are located so that an electrical connection can be made to pick-off coils 96A, 96B contained inside the shafts 98A, 98B. The pick-off coils 96A, 96B generate an a-c signal to generate a magnetic field inside the meter 86 at a given carrier frequency. As the turbine rotors 92A, 92B rotate, their vanes 94 cause a pulse to be superimposed on the carrier waveform generated by the pick-off coils 96A, 96B. This pulse encoded carrier signal is communicated to the control system 52 via its coupling to the pick-off coils 96A, 96B. The vapor 78 flow rate is proportional to the rotational speed of the rotors 92A, 92B. In this manner, the control system 52 can determine the rotational speed of the turbine rotors 92A, 92B to determine the rate of vapor 78 entering the vapor flow meter 86 and exiting out of the vapor flow meter via the outlet 99 and thereafter returning to the underground storage tank 34.

Even after the vapor 78 discontinues flowing inside the turbine vapor flow meter 86, the rotors 92A, 92B will continue to rotate for a period of time due to their previous rotational momentum. This could cause inaccurate measurement of vapor 78 rate, because the rotors 92A, 92B will continue to rotate and superimpose pulses on the pick-off coil 96A, 96B carrier signals even after vapor 78 flow has stopped. It is this problem that the present invention solves so that a turbine vapor flow meter 86 may be used to accurately measure recovered vapor 78.

Figure 4:
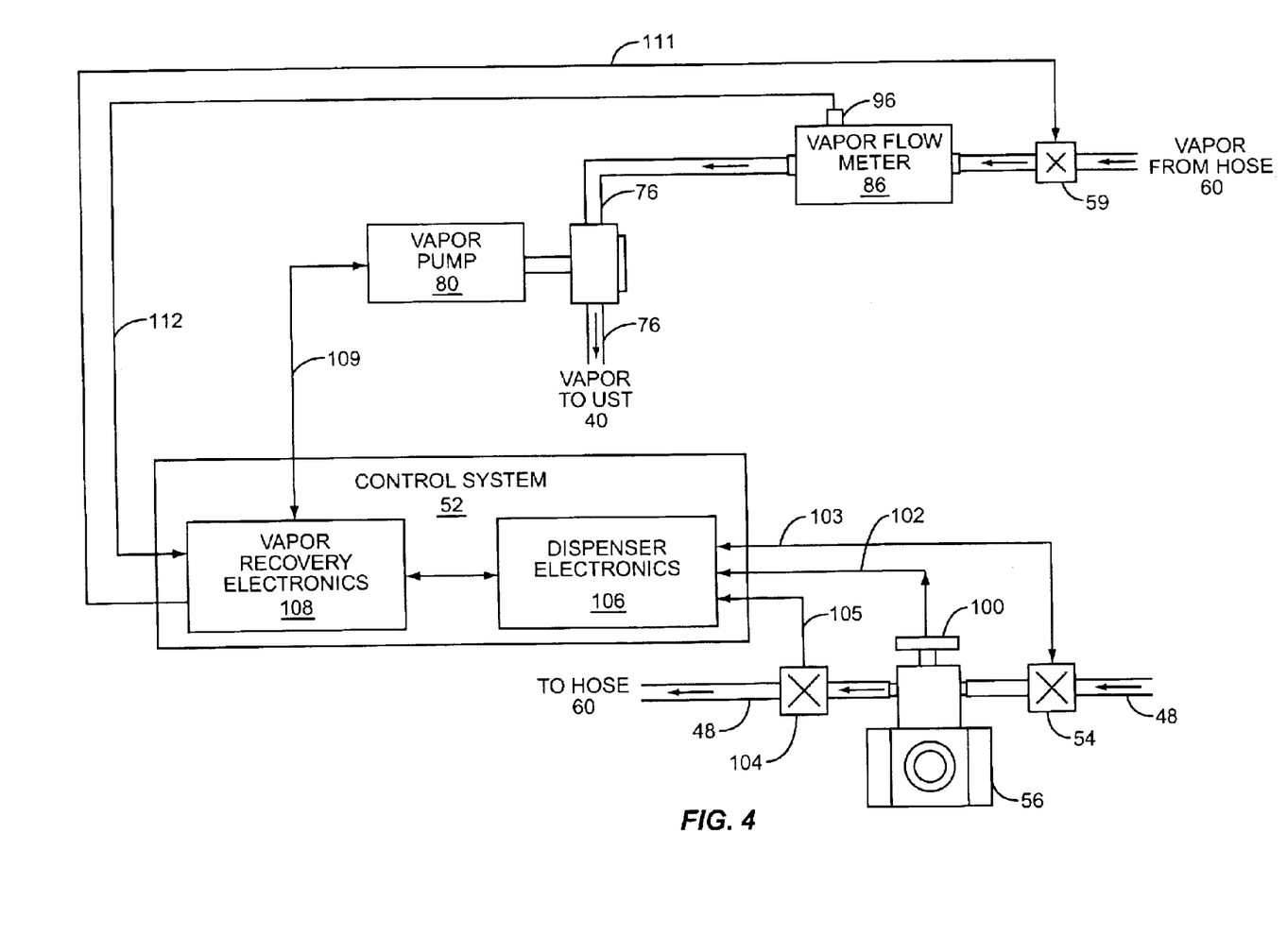
FIG. 4 illustrates an embodiment of a fuel dispenser internal component diagram illustrating the communication and interrelation of fuel dispenser components of the present invention.
Figure 5:
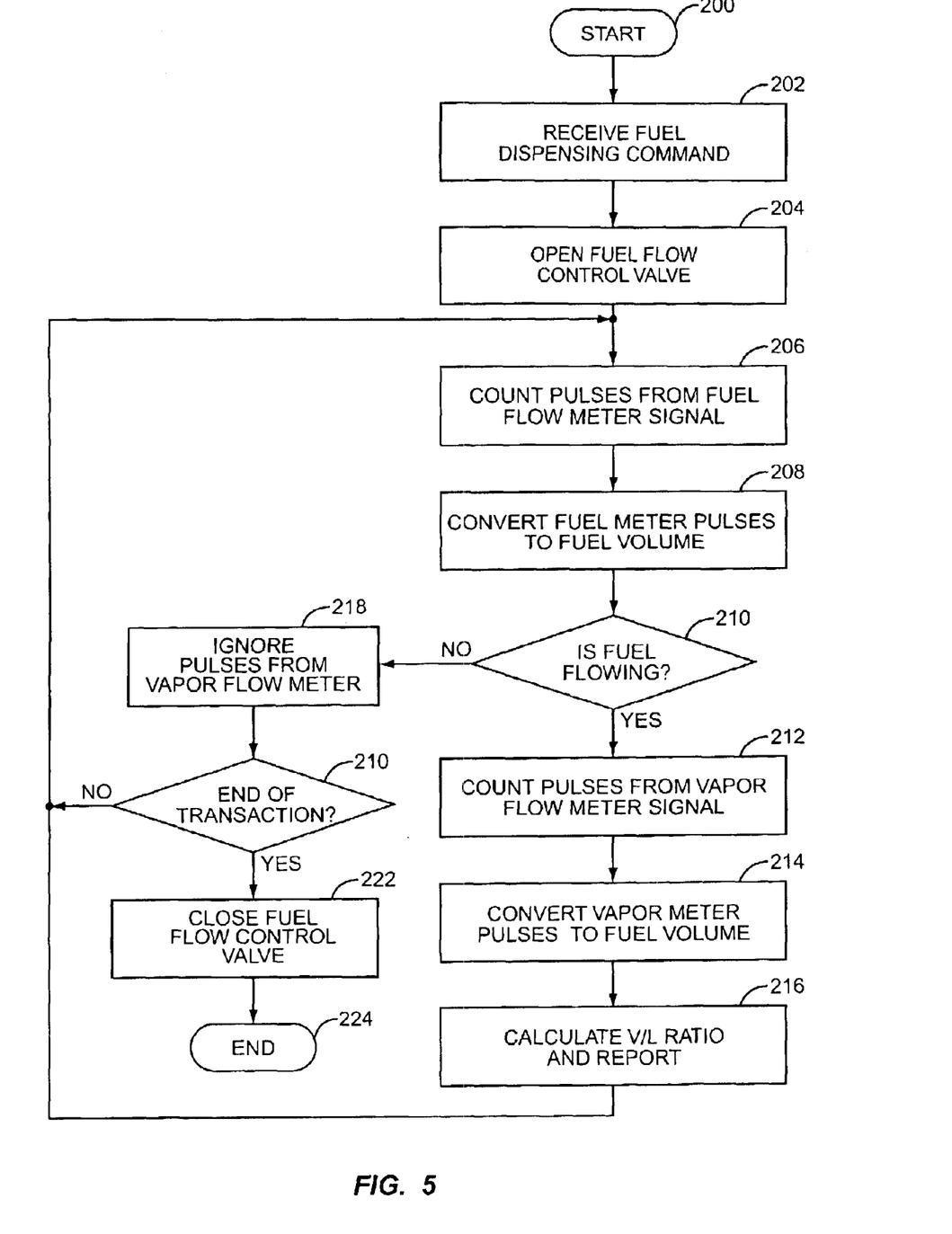
FIG. 5 is a flow chart illustrating the operation of one embodiment of the present invention.

FIGS. 4 and 5 illustrate the solutions to this problem according to the present invention. The present invention solves this problem generally by ignoring measurements made by the vapor flow meter 86 when fuel 44 is not flowing, and acknowledging measurements made by the vapor flow meter 86 when fuel 44 is flowing. This is because vapor 78 is not pushed out of the vehicle fuel tank 72 unless fuel 44 is being delivered into the vehicle fuel tank 72. There are several different methods and indicators that can be used to determine when fuel 44 is flowing and when it is not, all of which can be used in the present invention.

FIG. 4 illustrates a fuel dispenser 30 component diagram related to how the fuel dispenser 30 determines the rate of vapor 78 being recovered and returned to the underground storage tank 34 through the vapor return line 76. Fuel 44 begins flowing through the fuel conduit 48 and encounters a fuel flow control valve 54. The control system 52 controls the opening and closing of the fuel flow control valve 54 depending on when fueling is desired. When dispensing is activated, the dispenser electronics 106 sends a fuel flow control valve signal 103 to the fuel flow control valve 54 to open, thereby allowing fuel 44 to pass therethrough. The fuel 44 then enters the fuel meter 56 to be measured.

The fuel meter 56 may be an inferential meter or positive displacement meter. In the example illustrated in FIG. 4, the fuel meter 56 is a positive displacement meter. As the fuel 44 enters the fuel meter 56, a pulser 100 generates a fuel flow meter pulser signal 102 that is inputted into the dispenser electronics 106. The fuel flow meter purser signal 102 is a pulse stream indicative of the fuel 44 flow volume through the fuel meter 56. For example, a thousand fuel flow meter pulser signals 102 may equal one gallon of fuel 44. The vapor flow meter 86 also communicates a vapor flow meter pulser signal 112 to the control system 52 so that the control system 52 can measure the rate of vapor 78 being recovered. When the dispenser electronics 106 receives the fuel flow meter pulser signal 102, the dispenser electronics 106 communicates to the vapor recovery electronics 108 to activate the vapor recovery system of the fuel dispenser 30 in this embodiment.

As the fuel 44 exits the fuel meter 56, the fuel 44 passes through a flow switch 104 located on the outlet side of the fuel meter 56. The flow switch 104 is optional, and is one method of determining when pulses from the vapor flow meter 86 are being generated falsely even though the turbine rotors 92 continue to rotate. After the fuel 44 exits the flow switch 104, the fuel 44 is delivered to the hose 60 and nozzle 62 to be delivered to the vehicle fuel tank 72.

The fuel switch 104 opens and closes based on the force of the fuel 44 flowing out of the fuel meter 56. When fuel 44 is flowing at a rate above a certain threshold, the flow switch 104 opens. When fuel 44 is no longer flowing and/or at a rate below a threshold value, the flow switch 104 closes. A flow switch signal 105 indicates when the flow switch 104 is open and closed. This flow switch signal 105 is inputted into the dispenser electronics 106.

The vapor recovery electronics 108 outputs a vapor pump signal 109 to the vapor pump 80 to be activated when the dispenser electronics 106 receives fuel flow meter pulser signals 102 from the pulser 100. If a vapor valve 59 is provided, the control system 52 also generates a vapor valve signal 111 to open the vapor valve 59 to allow vapor 78 to pass through the vapor return line 76. The vapor pump 80 causes a vacuum to be created inside the vapor return line 76 such that vapor 78 escaping from the vehicle fuel tank 72 is drawn into the vapor return line 76. As the vapor 78 returns in the vapor return line 76 back to the underground storage tank 34, the vapor 78 passes through the turbine vapor flow meter 86, which may be like that illustrated in FIG. 3. As the turbine rotors 92A, 92B rotate, the pick-off coil 96 generates a pulse stream by emitting a vapor flow meter pulser signal 112 that is input into the dispenser electronics 106. In this manner, the volume of vapor 78 passing through the vapor return line 76 and passed back to the underground storage tank 34 can be measured and recorded by the dispenser electronics 106.

In FIG. 4, the dispenser electronics 106 and vapor recovery electronics 108 are shown as separate subsystems of the control system 52; however, these control electronics may be incorporated into one system.

The turbine vapor flow meter 86 may continue to generate a vapor flow meter pulser signal 112 even after vapor 78 has stopped flowing through the vapor return line 76 due to the forward momentum of the turbine rotors 92. Therefore, the present invention provides for the control system 52 to be able to ignore the vapor flow meter pulser signal 112 when vapor 78 is no longer flowing through the vapor return line 76 so that vapor 78 flow measurements discontinue to occur after fuel 44 flow stops. This is because vapor 78 is not pushed out of the vehicle fuel tank 72 when fuel 44 is not being delivered to the vehicle fuel tank 72. The present invention encompasses ignoring the vapor flow meter pulser signal 112 when fuel 44 is not flowing, and acknowledging the vapor flow meter pulser signal 112 when fuel 44 is flowing.

FIG. 5 illustrates a flow chart of how the control system 52 determines when to acknowledge and to ignore the vapor flow meter pulser signal 112 to provide an accurate accounting of vapor 78 being returned to the underground storage tank 34.

The process starts (step 200) and the fuel dispenser 30 receives a dispensing command to begin dispensing (step 202). The fuel dispenser 30 opens the fuel flow control valve 54 to allow fuel 44 to flow through the fuel conduit 48 (step 204). The control system 52 begins to count pulses from the fuel flow meter pulser signal 102 (step 206). The control system 52 converts the fuel flow meter pulser signal 102 into fuel volume (step 208). If after this point fuel 44 is flowing as indicated by fuel flow meter pulser signal 102 (decision 210), the control system 52 counts pulses from the vapor flow meter pulser signal 112 (step 212) and converts the vapor flow meter pulser signal 112 to a vapor volume (step 214).

The control system 52 may perform the optional step of calculating a volume to liquid ratio (V/L) by dividing the vapor volume by the fuel volume, as performed in steps 208 and 214, respectively (step 216). The V/L ratio may also be reported to any number of systems including the site controller 26, the tank monitor 36, and off-site using off-site communication links 28, 38. An alarm may be generated if the V/L ratio is not within predesigned limits. For more information on determination of V/L ratios for vapor recovery-equipped fuel dispensers 30, and related performance, see U.S. Pat. No. 6,460,579 entitled "Vapor flow and hydrocarbon concentration sensor for improved vapor recovery in fuel dispensers," incorporated herein by reference in its entirety.

After the V/L ratio is calculated, if desired (step 216), the process repeats by returning back to step 206 whereby the fuel dispenser 30 continues to count pulses from the fuel flow meter pulser signal 102.

If in decision 210 fuel 44 is not flowing, the control system 52 inherently knows that vapor 78 is also no longer flowing through the vapor return line 76 since vapor 78 is only pushed out of the vehicle fuel tank 72 if fuel 44 is being dispensed into the vehicle fuel tank 72. The control system 52 thereafter ignores the vapor flow meter pulser signal 112 received from the vapor flow meter 86 (step 218). The control system 56 next determines if fuel 44 is no longer flowing because the fueling transaction is complete (decision 220). If the fueling transaction is complete, typically because the nozzle 60 is returned back to the fuel dispenser 30 and/or the nozzle 60 lift handle (not shown) is placed back down in its resting position, the control system 56 closes the fuel flow control valve 54 (step 222) and the fueling transaction ends (step 224). If the fueling transaction is not completed (decision 220), the process returns back to step 206 to continue counting any pulses 101 from the pulser 100.

Although FIGS. 4 and 5 describe generally the present invention of ignoring vapor flow meter pulser signals 112 when fuel 44 is no longer flowing to arrive at an accurate vapor 78 flow recovery measurement, there are several different methods and techniques in which the control system 52 can choose to determine when fuel 44 is flowing or not. Although the present invention is not limited to these specific methods and techniques, specific methods and techniques are described below.

Flow Switch

One method of the control system 52 determining when to ignore and when to acknowledge vapor flow meter pulser signals 112 from the vapor flow meter 58 encompasses use of a flow switch. As illustrated in FIG. 4, as the fuel 44 exits the fuel meter 56, the fuel 44 passes through a flow switch 104 located on the outlet side of the fuel meter 56. The flow switch 104 is optional, and is one method of determining when pulses from the vapor flow meter 86 are being generated falsely even though the turbine rotors 92 continue to rotate. After the fuel 44 exits the flow switch 104, the fuel 44 is delivered to the hose 60 and nozzle 62 to be delivered to the vehicle fuel tank 72.

The fuel switch 104 opens and closes based on the force of the fuel 44 flowing out of the fuel meter 56. When fuel 44 is flowing at a rate above a certain threshold, the flow switch 104 opens. When fuel 44 is no longer flowing or is flowing at a rate below a threshold value, the flow switch 104 closes. A flow switch signal 105 indicates when the flow switch 104 is open and closed. This flow switch signal 105 is inputted into the dispenser electronics 106. In one embodiment of the present invention, the dispenser electronics 106 ignores the vapor flow meter purser signal 112 when the fuel flow switch signal 105 indicates that fuel 44 is no longer flowing or is flowing at a significantly low flow rate. This is because vapor 78 cannot be recovered if fuel 44 is not flowing to the vehicle fuel tank 72.

Fuel Meter Pulser Signal

Another method for the control system 52 to determine when to ignore and when to acknowledge vapor flow meter pulser signals 112 from the vapor flow meter 58 is by use of the fuel meter pulser 100. When the fuel meter pulser 100 generates a pulser signal 101, fuel 44 is flowing through the flow meter 56. When fuel 44 is flowing through the flow meter 56 at more than a nominal rate, fuel 44 is being delivered to the vehicle fuel tank 72 via the hose 60 and nozzle 62. Therefore, the control system 52 can choose to acknowledge or ignore vapor flow meter pulser signal 112 based on when fuel meter pulse signals 101 are received and not received, respectively.

Fuel Flow Control Valve

Another method for the control system 52 to determine when to ignore and when to acknowledge vapor flow meter pulser signals 112 from the vapor flow meter 58 is by detection of the fuel flow control valve control signal 103. When the control system 52 desires to allow fuel 44 to be delivered to a vehicle fuel tank 72, the control system 52 generates a fuel flow control valve signal 103 to open the fuel flow control valve 54. When the control system 52 desires to discontinue fuel 44 delivery to a vehicle fuel tank 72, the control system 52 generates a fuel flow control valve signal 103 to close the fuel flow control valve 54. The control system 52 may use the output of the fuel flow control valve signal 56 to determine when to ignore (when fuel flow control valve 54 is closed) and when to acknowledge (when fuel flow control valve 54 is opened) vapor flow meter purser signals 112. This embodiment may be particularly of value for the unillustrated embodiment of the control system 52 that receives fuel flow meter pulser signal 102 being a different system from the control system that determines when to ignore and when to acknowledge the vapor flow meter pulser signal 112 since the "Fuel Meter Pulser Signal" embodiment, described above, cannot be used for such a separate control system 52 architecture.

Vapor Pump Signal

Another method for the control system 52 to determine when to ignore and when to acknowledge vapor flow meter pulser signals 112 from the vapor flow meter 58 is by use of the vapor pump signal 109. When the control system 52 generates a vapor pump signal 109 to activate the vapor pump 80, this means that the control system 52 is receiving a fuel flow meter pulser signal 102 indicative of fuel 44 flow. The control system 52 may use the output of the vapor pump signal 109 to determine when to ignore (when vapor pump signal 109 is not active) and when to acknowledge (when vapor pump signal 109 is active) vapor flow meter pulser signals 112.

Vapor Valve

If the fuel dispenser 30 contains a vapor valve 59, as illustrated in FIG. 2, the control system 52 opens the vapor valve 59 once fuel 44 begins flowing so that recovered vapors 78 can return through the vapor return line 76 back to the underground storage tank 34. The vapor valve 59 is closed when the fuel dispenser 30 is not operational so that air is not pulled into the underground storage tank 34 during idle times. When the control system 52 generates a vapor pump signal 109 to activate the vapor pump 80, this means that the control system 52 is receiving fuel flow meter pulser signal 102 indicative of fuel 44 flow. The control system 52 may use the output of the vapor valve signal 111 to determine when to ignore (when vapor valve signal 111 is not active) and when to acknowledge (when vapor valve signal 111 is active) vapor flow meter pulser signals 112.

Those skilled in the art will recognize improvements and modifications to the preferred embodiments of the present invention. All such improvements and modifications are considered within the scope of the concepts disclosed herein and the claims that follow.

What is claimed is:

1. A vapor recovery-equipped fuel dispenser that dispenses fuel from a storage tank to a vehicle and recovers vapor from the vehicle during refueling, comprising:

a fuel conduit that carries the fuel from the storage tank;

a vapor return line that carries the vapor from the vehicle back to the storage tank;

a hose and nozzle combination fluidly coupled to said fuel conduit and said vapor return line wherein said hose and nozzle receives the fuel and delivers the fuel to the vehicle, and wherein said hose and nozzle receives the vapor recovered from the vehicle to return to said vapor return line;

a fuel flow control valve located inline to said fuel conduit, wherein a control system controls the opening and closing of said fuel flow control valve to control fuel flow through said fuel conduit;

a fuel meter located inline to said fuel conduit that measures the amount of fuel received from the storage tank, and communicates a fuel flow signal to said control system; and a turbine vapor flow meter located inline to said vapor return line that measures the amount of recovered vapor, and communicates a vapor flow signal to said control system;

said control system adapted to ignore said vapor flow signal when said fuel is no longer being dispensed to the vehicle.

2. The fuel dispenser of claim 1, wherein said control system ignores said vapor flow signal when said fuel flow signal is no longer received by said control system.

3. The fuel dispenser of claim 2, wherein said fuel flow signal is a pulse stream and said control system converts said pulse stream into a volume.

4. The fuel dispenser of claim 1, wherein said control system generates a fuel flow control valve signal that controls the opening and closing of said fuel flow control valve, wherein said control system ignores said vapor flow signal when said fuel flow control valve signal indicates closing said fuel flow control valve.

5. The fuel dispenser of claim 4, wherein said fuel flow control valve is a proportional flow control valve.

6. The fuel dispenser of claim 1, wherein a second control system generates a vapor pump signal that controls a vapor pump located inline to said vapor return line that generates a vacuum inside said vapor return line, wherein said control system ignores said vapor flow signal when said vapor pump signal indicates closing said fuel flow control valve.

7. The fuel dispenser of claim 6, wherein said control system and said second control system are the same control system.

8. The fuel dispenser of claim 6, wherein said vapor pump is a variable speed vapor pump, and wherein said vapor pump signal is a signal proportional to the speed of said vapor pump, wherein said control system ignores said vapor flow signal based on the speed of said vapor pump passing below a threshold value.

9. The fuel dispenser of claim 1, wherein said fuel flow meter is a turbine fuel flow meter and flow switch wherein said flow switch indicates when fuel is no longer flowing through said turbine fuel flow meter, and wherein said control system ignores said vapor flow signal when said flow switch indicates fuel is not longer flowing through said turbine fuel flow meter.

10. The fuel dispenser of claim 1, wherein said hose and nozzle combination contains a vapor valve communicatively coupled to said control system wherein said vapor valve opens to allow recovered vapor to enter said hose and vapor return line when fuel is delivered, and wherein said control system ignores said vapor flow signal when said vapor valve is closed.

11. The fuel dispenser of claim 1, wherein said vapor return line contains a vapor valve communicatively coupled to said control system wherein said vapor valve opens to allow recovered vapor to enter said vapor return line when fuel is delivered, and wherein said control system ignores said vapor flow signal when said vapor valve is closed.

12. The fuel dispenser of claim 2, wherein said control system uses said fuel flow signal to determine the volume of fuel delivered to the vehicle, and said control system uses said vapor flow signal to determine the volume of vapor recovered from the vehicle during refueling.

13. The fuel dispenser of claim 12, wherein said control system calculates a vapor to fuel ratio by dividing said volume of vapor recovered by said volume of fuel delivered.

14. The fuel dispenser of claim 13, wherein said control system communicates said vapor to fuel ratio to a system in the group consisting of a site controller, a tank monitor, and a remote system.

15. A method for measuring the amount of vapor recovered by a vapor recovery-equipped fuel dispenser during refueling of a vehicle, comprising the steps of:
receiving a fuel flow signal from a fuel meter that measures the amount of fuel dispensed to the vehicle;
receiving a vapor flow signal from a turbine vapor flow meter that measures the amount of vapor recovered during refueling of the vehicle; and
ignoring said vapor flow signal when fuel is no longer being dispensed to the vehicle.

16. The method of claim 15, further comprising the step of converting said vapor flow signal into a volume of vapor recovered.

17. The method of claim 15, wherein said step of ignoring comprises ignoring said vapor flow signal when said fuel flow signal is no longer received.

18. The method of claim 17, further comprising the step of converting said fuel flow signal into the fuel volume.

19. The method of claim 15, further comprising the steps of:
controlling the fuel flow using a fuel flow control valve; and
generating a fuel flow control valve signal that controls the opening and closing of said fuel flow control valve;
wherein said step of ignoring comprises ignoring said vapor flow signal when said fuel flow control valve signal indicates closing said fuel flow control valve.

20. The method of claim 15, further comprising the steps of:
controlling the amount of vapor recovered using a vapor pump; and
generating a vapor pump signal that controls said vapor pump;
wherein said step of ignoring comprises ignoring said vapor flow signal based on said vapor pump signal indicating that said vapor pump is deactivated.

21. The method of claim 20, further comprising the step of:
adjusting the speed of said vapor pump using a vapor pump signal;
wherein said step of ignoring comprises ignoring said vapor flow signal based on the speed of said vapor pump passing below a threshold value.

22. The method of claim 15, further comprising the step of:
indicating when fuel is no longer flowing through said fuel flow meter using a flow switch;
wherein said step of ignoring comprises ignoring said vapor flow signal when said flow switch indicates when fuel is no longer flowing through said turbine fuel flow meter.

23. The method of claim 15, further comprising the step of:
controlling the amount of vapor recovered using a vapor valve;
wherein said step of ignoring comprises ignoring said vapor flow signal when said vapor valve is closed.

24. The method of claim 15, further comprising the steps of:
determining the volume of fuel delivered to the vehicle using said fuel flow signal; and
determining the volume of vapor recovered from the vehicle during refueling using said vapor flow signal.

25. The method of claim 24, further comprising the step of calculating a vapor to fuel ratio by dividing said volume of vapor recovered by said volume of fuel delivered.

26. The method of claim 25, further comprising the step of communicating said vapor to fuel ratio to a control system in the group consisting of a site controller, a tank monitor, and a remote system.

* * * * *